(12) United States Patent
Elangovan et al.

(10) Patent No.: US 11,267,439 B2
(45) Date of Patent: Mar. 8, 2022

(54) ACTIVATION OF VALET MODE FOR VEHICLES

(71) Applicant: Ford Global Technologies, LLC, Dearborn, MI (US)

(72) Inventors: Vivekanandh Elangovan, Canton, MI (US); Aaron Matthew DeLong, Toledo, OH (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 16/297,247

(22) Filed: Mar. 8, 2019

(65) Prior Publication Data

US 2020/0282951 A1  Sep. 10, 2020

(51) Int. Cl.
| | | |
|---|---|---|
| *B60R 25/20* | (2013.01) | |
| *H04W 12/06* | (2021.01) | |
| *B60R 25/01* | (2013.01) | |
| *H04W 4/80* | (2018.01) | |
| *H04B 5/00* | (2006.01) | |
| *B60R 25/24* | (2013.01) | |
| *H04W 12/47* | (2021.01) | |
| *G07C 9/00* | (2020.01) | |

(52) U.S. Cl.
CPC .......... *B60R 25/2081* (2013.01); *B60R 25/01* (2013.01); *B60R 25/24* (2013.01); *B60R 25/241* (2013.01); *H04B 5/0031* (2013.01); *H04W 4/80* (2018.02); *H04W 12/06* (2013.01); *H04W 12/47* (2021.01); *B60R 2325/103* (2013.01); *G07C 9/00309* (2013.01)

(58) Field of Classification Search
CPC ... B60R 25/2081; B60R 25/241; B60R 25/01; B60R 25/24; B60R 2325/103; H04W 12/00407; H04W 12/06; H04W 4/80; H04B 5/0031; G07B 9/00309
See application file for complete search history.

(56) References Cited

U.S. PATENT DOCUMENTS

| | | | | |
|---|---|---|---|---|
| 5,479,156 A | * | 12/1995 | Jones .................. | B60R 25/1003 340/12.5 |
| 5,534,845 A | * | 7/1996 | Issa ..................... | B60R 25/1004 340/425.5 |
| 6,430,488 B1 | * | 8/2002 | Goldman ............... | B60R 25/00 701/36 |
| 8,798,809 B2 | * | 8/2014 | Kalhous ................. | B60R 25/24 701/2 |
| 9,725,071 B2 | * | 8/2017 | Miller ................ | G07C 9/00174 |

(Continued)

FOREIGN PATENT DOCUMENTS

| | | |
|---|---|---|
| DE | 102016204385 A1 | 9/2017 |
| DE | 102017213575 B3 | 8/2018 |

*Primary Examiner* — Dale W Hilgendorf
(74) *Attorney, Agent, or Firm* — Frank Lollo; Eversheds Sutherland (US) LLP

(57) ABSTRACT

Method and apparatus are disclosed for activation of valet mode for vehicles. An example vehicle system includes a remote near-field communication (NFC) device and a vehicle. The vehicle includes an engine, a cabin, and an interior NFC reader located in the cabin. The vehicle also includes a controller configured to enter a valet mode and authenticate the remote NFC device for the valet mode when the engine is active and the interior NFC reader communicates with the remote NFC device.

20 Claims, 6 Drawing Sheets

(56) References Cited

U.S. PATENT DOCUMENTS

| | | | | |
|---|---|---|---|---|
| 9,767,629 | B1* | 9/2017 | Gulati | G07C 9/20 |
| 10,131,321 | B1* | 11/2018 | Ahsan | G07B 15/02 |
| 10,257,730 | B1* | 4/2019 | Van Wiemeersch | H04W 12/08 |
| 2004/0135670 | A1* | 7/2004 | Guba | H04M 3/38 |
| | | | | 340/5.21 |
| 2004/0236508 | A1* | 11/2004 | Ogasawara | G06F 21/6245 |
| | | | | 701/532 |
| 2005/0190039 | A1* | 9/2005 | Aoyama | B60R 25/246 |
| | | | | 340/5.21 |
| 2009/0309696 | A1* | 12/2009 | Tsuruta | G07C 9/00309 |
| | | | | 340/5.22 |
| 2014/0168681 | A1* | 6/2014 | Nakamura | H04B 5/0031 |
| | | | | 358/1.13 |
| 2014/0335789 | A1* | 11/2014 | Cohen et al. | H04W 12/06 |
| | | | | 455/41.2 |
| 2015/0203125 | A1* | 7/2015 | Penilla | G07C 5/0808 |
| | | | | 701/1 |
| 2015/0294518 | A1* | 10/2015 | Peplin | G07C 9/00571 |
| | | | | 340/5.22 |
| 2016/0021238 | A1* | 1/2016 | Abramson et al. | H04W 4/80 |
| | | | | 455/418 |
| 2016/0300417 | A1* | 10/2016 | Hatton | G07C 9/00857 |
| 2016/0347282 | A1* | 12/2016 | Krishnan | B60R 25/23 |
| 2017/0101076 | A1* | 4/2017 | Krishnan | H04W 4/80 |
| 2017/0113650 | A1* | 4/2017 | Caushi | G07C 9/00174 |
| 2018/0009416 | A1* | 1/2018 | Maiwand | G07C 9/00571 |
| 2020/0359216 | A1* | 11/2020 | Akpinar et al. | H04W 12/06 |

\* cited by examiner

ACTIVATION OF VALET MODE FOR VEHICLES

TECHNICAL FIELD

The present disclosure generally relates to valet mode and, more specifically, to activation of valet mode for vehicles.

BACKGROUND

Increasingly, vehicles are being manufactured with keyless entry systems that facilitate a driver unlocking and starting the vehicle without a key. Passive-entry-passive-start (PEPS) systems use a fob. In such a system, when the fob is close to the vehicle, the vehicle primes the doors to unlock when a door handle is touched. Additionally, when the fob is inside the vehicle, the vehicle enables push-button ignition. Phone-as-a-key (PaaK) systems are similar, except instead of a dedicated fob, the system uses the driver's phone coupled with an application executing on the phone to determine when to unlock the doors and enable the ignition.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for activation of valet mode for vehicles. An example disclosed vehicle system includes a remote near-field communication (NFC) device and a vehicle. The vehicle includes an engine, a cabin, and an interior NFC reader located in the cabin. The vehicle also includes a controller configured to enter a valet mode and authenticate the remote NFC device for the valet mode when the engine is active and the interior NFC reader communicates with the remote NFC device.

In some examples, the controller is configured to remain in the valet mode after the engine is deactivated. In some examples, while in the valet mode, the controller is configured to at least one of set a center console display in a locked mode, limit a travelling speed, and limit a travelling distance. In some examples, the vehicle further includes a touchscreen that is configured to present a confirmation screen upon the interior NFC reader communicating with the remote NFC device and prior to the controller entering the valet mode.

In some examples, the remote NFC device is a key fob. In some examples, the remote NFC device is a battery-less device. In some such examples, the remote NFC device has a form factor of a credit card. In some examples, the remote NFC device includes one or more buttons. In such examples, the controller is configured to enter the valet mode and authenticate the remote NFC device for the valet mode when the engine is active, and a predefined code is received via the one or more buttons.

In some examples, the vehicle further includes a start button. In such examples, the controller is configured to start the engine in the valet mode in response to the interior NFC reader communicating with the remote NFC device and the start button subsequently being actuated to a start position.

In some examples, the vehicle further includes an exterior NFC reader, a door, and a door lock. In some such examples, the controller is configured to unlock the door lock in the valet mode in response to the exterior NFC reader communicating with the remote NFC device. In some such examples, the controller is configured to exit the valet mode in response to the exterior NFC reader communicating with a mobile device or a key fob of a user of the vehicle.

In some examples, the vehicle further includes a keypad. In such examples, the controller is configured to exit the valet mode in response to the keypad receiving a predefined code.

An example disclosed vehicle includes a keypad, a near-field communication (NFC) reader, and a controller. The controller is configured to enter a valet mode and authenticate a remote NFC device for the valet mode in response to detecting that the remote NFC device is held in front of the NFC reader and the keypad has received a predefined code.

Some examples further include an exterior surface along which the keypad and the NFC reader are located. Some examples further include an engine. In such examples, the controller is configured to enter the valet mode and authenticate the remote NFC device for the valet mode responsive to detecting that the remote NFC device is held in front of the NFC reader, the keypad has received the predefined code, and the engine is active. Some examples further include a horn and exterior lamps. In such examples, the controller is configured to emit an alert via at least one of the horn and the exterior lamps upon entering the valet mode.

An example disclosed vehicle system includes a remote near-field communication (NFC) device and a vehicle. The vehicle includes a communication module for communication with a mobile device. The vehicle also includes a controller configured to enter a valet mode and authenticate the remote NFC device for the valet mode in response to receiving an instruction signal, via the communication module, that the mobile device transmits.

In some examples, the vehicle further includes an engine. In such examples, the controller is configured to enter the valet mode and authenticate the remote NFC device for the valet mode in response to detecting that the engine is active and receiving the instruction signal from the mobile device.

In some examples, the remote NFC device includes one or more buttons. In such examples, the controller is configured to enter the valet mode and authenticate the remote NFC device for the valet mode in response to receiving the instruction signal that the mobile device transmits when a predefined code is received via the one or more buttons.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
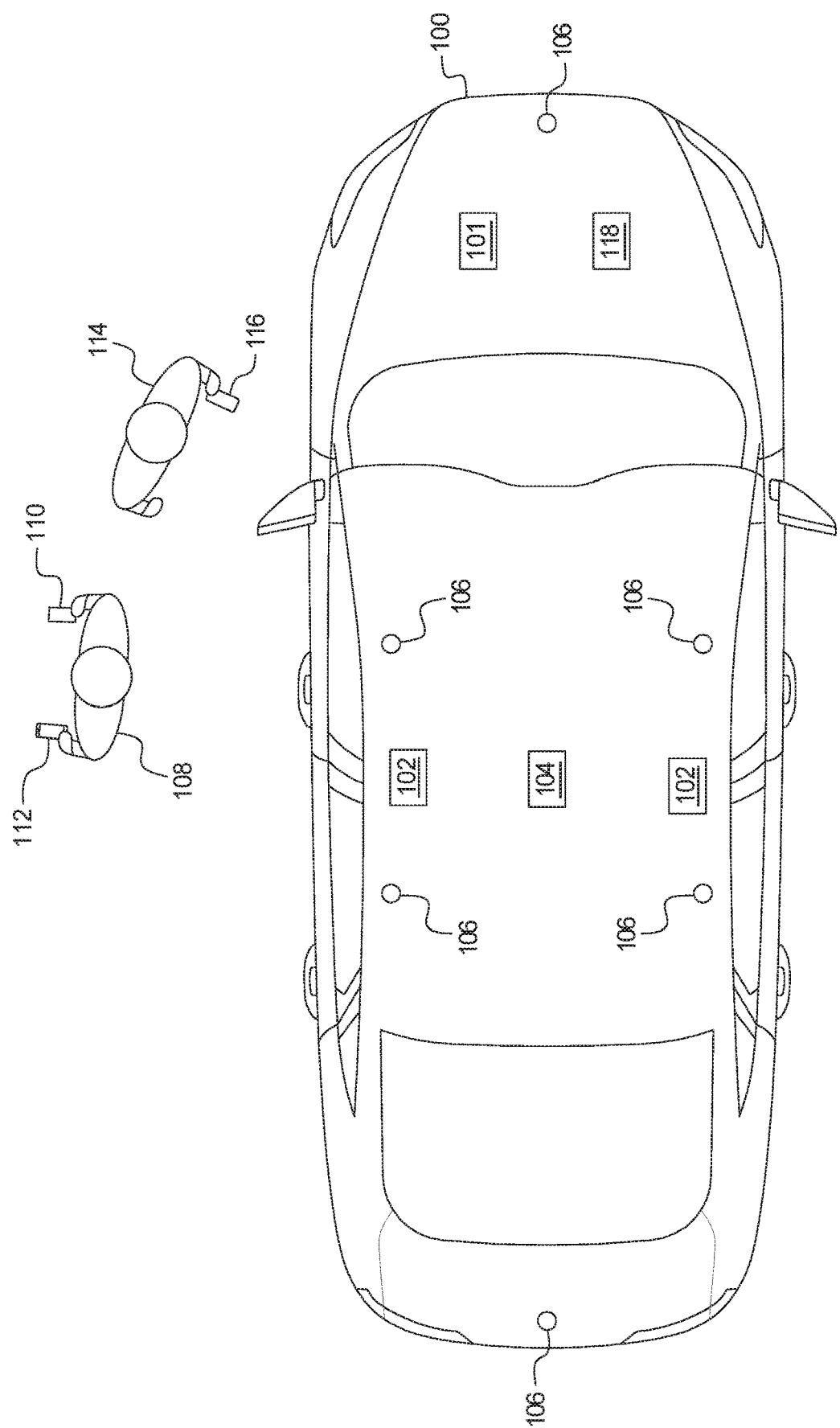
FIG. 1 illustrates an example environment in which a valet mode is utilized in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Increasingly, vehicles are being manufactured with keyless entry systems that facilitate a driver unlocking and starting the vehicle without a key. Passive-entry-passive-start (PEPS) systems use a fob. In such a system, when the fob is close to the vehicle, the vehicle primes the doors to unlock when a door handle is touched. Additionally, when the fob is inside the vehicle, the vehicle enables push-button ignition. Phone-as-a-key (PaaK) systems are similar, except instead of a dedicated fob, the system uses the driver's phone coupled with an application executing on the phone to determine when to unlock the doors and enable the ignition.

Recently, some vehicles include a valet mode that limits capabilities of one or more vehicle functions for use by a valet. For instance, when a user of a vehicle intends to hand over control of the vehicle to a valet, the user initiates the valet mode to limit the vehicle functions prior to providing access of the vehicle to the valet. Traditionally, the user of the vehicle hands keys of the vehicle to the valet to enable the valet to operate the vehicle. Some recent vehicle systems include fobs that are designated for use by a valet while the vehicle is in the valet mode. In some instances, the user of such vehicle systems potentially have difficulty in initiating the valet mode of the vehicle and/or activating the fob designated for use during the valet mode.

Example methods and apparatus disclosed herein enable a vehicle operator to quickly and securely enter a valet mode of a vehicle and authenticate a near-filed communication (NFC) device for the valet mode. As used herein, a "valet mode" refers to an operating mode of a vehicle that limits capabilities of one or more vehicle functions for use by a valet. As used herein, an "NFC device," an "NFC reader," and a "near-field communication device" refer to a device that includes hardware (e.g., an NFC antenna) and software for NFC communication. As used herein, a "remote NFC device" refers to a portable device that includes hardware (e.g., an NFC antenna) and software for NFC communication.

Examples disclosed herein are configured to authenticate an NFC device as a valet device in response to a vehicle operator (1) tapping the NFC device to an interior NFC reader of a vehicle when the vehicle is active, (2) holding a predefined keypad combination for a period of time, (3) pressing a predefined button sequence on the NFC device when the vehicle is active, (4) tapping the NFC device to a mobile device of the user when the mobile device is near the vehicle and the vehicle is inactive, and/or (5) pressing a predefined button sequence on the NFC device while tapping the NFC device to a mobile device of the user when the mobile device is near the vehicle and the vehicle is inactive. In some examples, the vehicle system presents a prompt to the mobile device of the vehicle operator for confirming that the valet mode is to be activated. Further, examples disclosed herein are configured to exit the valet mode of the vehicle and de-authenticate the NFC device for the valet mode in response to (1) the vehicle being started with a non-valet-mode device and/or (2) upon receiving a predefined code for exiting the valet mode.

Turning to the figures, FIG. 1 illustrates an example environment in which a valet mode of a vehicle 100 is utilized in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes an engine 101. For example, the engine 101 includes an internal combustion engine, an electric motor, a hybrid engine and/or any other power source that propels movement of the vehicle 100.

Further, the vehicle 100 of the illustrated example includes one or more distance-determination communication modules 102 that are utilized to determine a distance between the vehicle 100 and a remote device (e.g., a key fob). Each of the distance-determination communication modules 102 includes hardware (e.g., processors, memory, storage, antenna, etc.) and software to control the wired or wireless network interfaces. In some examples, the distance-determination communication modules 102 include hardware and software to communicate via low frequency (LF) signals and ultra-high frequency (UHF) signals. For example, the distance-determination communication modules 102 include an LF transmitter for LF communication and a receiver transceiver module for UHF and/or other medium frequency communication (e.g., 315 MHz to 902 MHz, etc.). The LF transmitter includes antenna to transmit an LF signal (e.g., 125 kHz to 130 kHz, etc.) that includes a beacon message. Further, the receiver transceiver module includes antenna to receive a return message from the remote device, for example, in the form of a UHF signal. To determine a distance between the remote device and the vehicle 100, the remote device identifies a distance that the beacon message has travelled. Further, the remote device includes a corresponding distance indicator (e.g., a received signal strength indicator) in the return message to enable the receiver transceiver module to identify the distance between the vehicle 100 and the remote device. Additionally or alternatively, the return message includes an authentication token (e.g., an encrypted identifier, an encrypted counter, etc.) to determine whether the remote device is authorized for communication with the vehicle 100.

The vehicle 100 of the illustrated example also includes a vehicle-function communication module 104 and antenna modules 106 for communication with a remote device (e.g., a key fob, a mobile device) designated for communication with the vehicle 100 to initiate vehicle functions, such as passive entry, passive start, remote entry, remote start, remote park-assist, etc. In some examples, the vehicle-function communication module 104 and the antenna modules 106 are configured to localize the remote device for initiation of one or more of the vehicle function(s).

As used herein, "passive entry" and "passive-entry" refer to a system of a vehicle that unlock(s) and/or open(s) one or more doors of the vehicle upon detecting that a key fob and/or phone-as-a-key is proximate to a door of the vehicle. Some passive entry systems trigger a door for opening in response to detecting that a key fob and/or phone-as-a-key is approaching and/or within a predetermined range of the vehicle. In such examples, the door is unlocked in response to detecting that (1) a user has touched a handle of the door and (2) the key fob and/or phone-as-a-key is proximate to the door when the handle is touched. As used herein, "passive start" and "passive-start" refer to a system of a vehicle that activates ignition of an engine of the vehicle upon detecting that a key fob and/or phone-as-a-key is within a cabin of the vehicle (e.g., such that drive-away is enabled). Some passive start systems trigger an engine for ignition in response to detecting that a key fob and/or phone-as-a-key is approaching and/or within a predetermined range of the vehicle. In such examples, the engine is started in response to detecting that (1) a user has engaged an ignition switch of the vehicle and (2) the key fob and/or phone-as-a-key is within the cabin when the ignition switch is engaged. As used herein, "passive entry passive start," "passive-entry passive-start" and a "PEPS" refer to a system of vehicle that is configured to perform passive entry and passive start for the vehicle.

As used herein, "vehicle park-assist" and "park-assist" refer to a system in which a vehicle controls its motive functions, without direct steering or velocity input from an operator (e.g., a driver), to autonomously park within a parking spot. For example, an autonomy unit of a park-assist system controls the motive functions of the vehicle upon receiving an initiation signal from the operator. As used herein, "remote parking," "vehicle remote park-assist," "remote park-assist," and "RePA" refer to a system in which a vehicle controls its motive functions, without direct steering or velocity input from an operator (e.g., a driver), to autonomously park within a parking spot while the operator is located outside of the vehicle. For example, an autonomy unit of a remote park-assist system controls the motive functions of the vehicle upon receiving a remote initiation signal from a mobile device of the operator.

The antenna modules 106 include hardware (e.g., processors, memory, storage, antenna, etc.) and software to control wireless network interface(s). For example, the antenna modules 106 are configured for personal or local area wireless network protocols (e.g., Bluetooth®, Bluetooth® Low Energy (BLE), Zigbee®, Z-Wave®, etc.). In some examples, the antenna modules 106 may be referred to as "BLE Antenna Modules (BLEAMs)" when the antenna modules 106 are configured to implement BLE communication. In some examples, the antenna modules 106 communicatively couple to a remote device and measure and/or receive measurements of the signal strength of the signals (e.g., received signal strength indicators) broadcast by the remote device to facilitate determining a distance to and/or a location of the remote device relative to the vehicle 100. Further, in some examples, one or more of the antenna modules 106 are located inside a cabin of the vehicle 100 (e.g., a cabin 200 of FIG. 2) to localize a remote device when the remote device is located within the cabin (e.g., to enable passive start of the vehicle 100).

The vehicle-function communication module 104 is communicatively coupled to the antenna modules 106. For example, the vehicle-function communication module 104 is communicatively coupled to the antenna modules 106 to track a distance to and/or a location of the remote device relative to the vehicle 100. The vehicle-function communication module 104 may be referred to as a "BLE Module (BLEM)" when the antenna modules 106 are configured to implement BLE communication. In some examples, the vehicle-function communication module 104 is configured to receive and analyze the signal strength measurements (e.g., received signal strength indicators) between the antenna modules 106 and the remote device. Based on these measurements, the vehicle-function communication module 104 determines a location of the remote device relative to the vehicle 100 to facilitate initiation of one or more vehicle functions. For example, a passive entry function is initiated upon the vehicle-function communication module 104 determining that the remote device is near a vehicle door and/or a passive start function is initiated upon the vehicle-function communication module 104 determining that the remote device is within the cabin 200.

In the illustrated example, a user 108 of the vehicle 100 carries a key fob 110 and a mobile device 112 to remotely operate vehicle functions of the vehicle 100. As used herein, a "key fob" refers to a dedicated electronic remote device that wirelessly communicates with a vehicle to unlock and/or lock vehicle door(s), open and/or close the vehicle door(s), activate an engine of the vehicle, and/or control other function(s) of the vehicle. As used herein, a "mobile device" refers to an electronic remote device that is configured to (1) wirelessly communicate with a vehicle to control vehicle function(s) and (2) wirelessly communicate with other device(s) to control non-vehicle-related functions. Example mobile devices include a smart phone, a wearable, a smart watch, a tablet, etc. In some examples, the key fob 110 and/or the mobile device 112 includes a NFC antenna to enable the key fob 110 and/or the mobile device 112 to communicate with another NFC device.

In some examples, both the key fob 110 and the mobile device 112 are utilized to enable the user 108 to remotely perform and/or initiate vehicle functions of the vehicle 100. For example, to initiate a remote park-assist system of the vehicle 100, the key fob 110 is in wireless communication with one or more of the distance-determination communication modules 102 to enable a distance between the user 108 and the vehicle 100 to be determined via LF communication and UHF communication. At the same time, the mobile device 112 is utilizing BLE communication to send remote park-assist instructions to the vehicle-function communication module 104 via the antenna modules 106.

Further, in the illustrated example, a valet 114 is carrying an NFC device 116 that is designated for use with the vehicle 100. The NFC device 116 is a remote NFC device (also referred to as a valet NFC device). For example, the NFC device 116 is configured to initiate remote entry and/or remote start functions of the vehicle 100 when the vehicle 100 is in a valet mode. When the vehicle 100 is not in a valet mode (e.g., when the vehicle 100 is in a normal operating mode), the NFC device 116 is unable to initiate remote entry, remote start, and/or other vehicle functions of the vehicle 100.

The vehicle 100 of the illustrated example also includes a valet controller 118. For example, the valet controller 118 is configured to quickly and securely activate and/or deactivate the valet mode of the vehicle 100. Further, the valet controller 118 is configured to quickly and securely authenticate and/or de-authenticate the NFC device 116 for use when the vehicle 100 is in the valet mode. When the vehicle 100 is in the valet mode, the valet controller 118 is configured to limit one or more vehicle functions of the vehicle 100. For example, the valet controller 118 is configured to set a center console display (e.g., a touchscreen 206 of FIG. 2) and/or other display in a locked mode to prevent the valet 114 from changing vehicle settings and/or accessing personal information of the user 108. Additionally or alternatively, the valet controller 118 is configured to limit a travelling speed and/or travelling distance while the vehicle 100 is in the valet mode to prevent the valet 114 from operating the vehicle 100 in an undesired manner.

In some examples, the valet controller 118 is configured to authenticate the NFC device 116 for the valet mode after the user 108 instructs the valet controller 118 to activate the valet mode. For example, the valet controller 118 activates the valet mode in response to receiving an instruction to do so from the user 108 via the mobile device 112 and/or a touchscreen (e.g., the touchscreen 206) of the vehicle. Additionally or alternatively, the valet controller 118 is configured to simultaneously enter the valet mode and authenticate the NFC device 116 for the valet mode. That is, the valet controller 118 enters the valet mode as the NFC device 116 is authenticated for the valet mode. Further, the valet controller 118 is configured to enter the valet mode while the engine 101 of the vehicle 100 is active and/or inactive. For example, when the valet controller 118 enters the valet mode while the engine 101 is active, the valet controller 118 is to remain in the valet mode after the engine 101 is deactivated.

Additionally, the valet controller 118 is configured to exit the valet mode and reenter a normal operating mode in response to receiving an instruction to do so. In some examples, the valet controller 118 is configured to deactivate the valet mode and reactivate the normal operating mode of the vehicle 100 in response to the engine 101 being started with a non-valet-mode device, such as the key fob 110 and/or the mobile device 112 of the user 108, to prevent an unauthorized user (e.g., the valet 114) from exiting the valet mode. For example, the valet controller 118 is configured to deactivate the valet mode and reactivate the normal operating mode when the user 108 utilizes the key fob 110 and/or the mobile device 112 for remote entry, remote start, passive entry, passive start, etc. Additionally or alternatively, the valet controller 118 is configured to deactivate the valet mode and reactivate the normal operating mode of the vehicle 100 in response to a keypad of the vehicle 100 (e.g., a keypad 306 of FIG. 3) receiving a predefined code known by the user 108 and/or other authorized users to prevent an unauthorized user (e.g., the valet 114) from exiting the valet mode.

Figure 2:
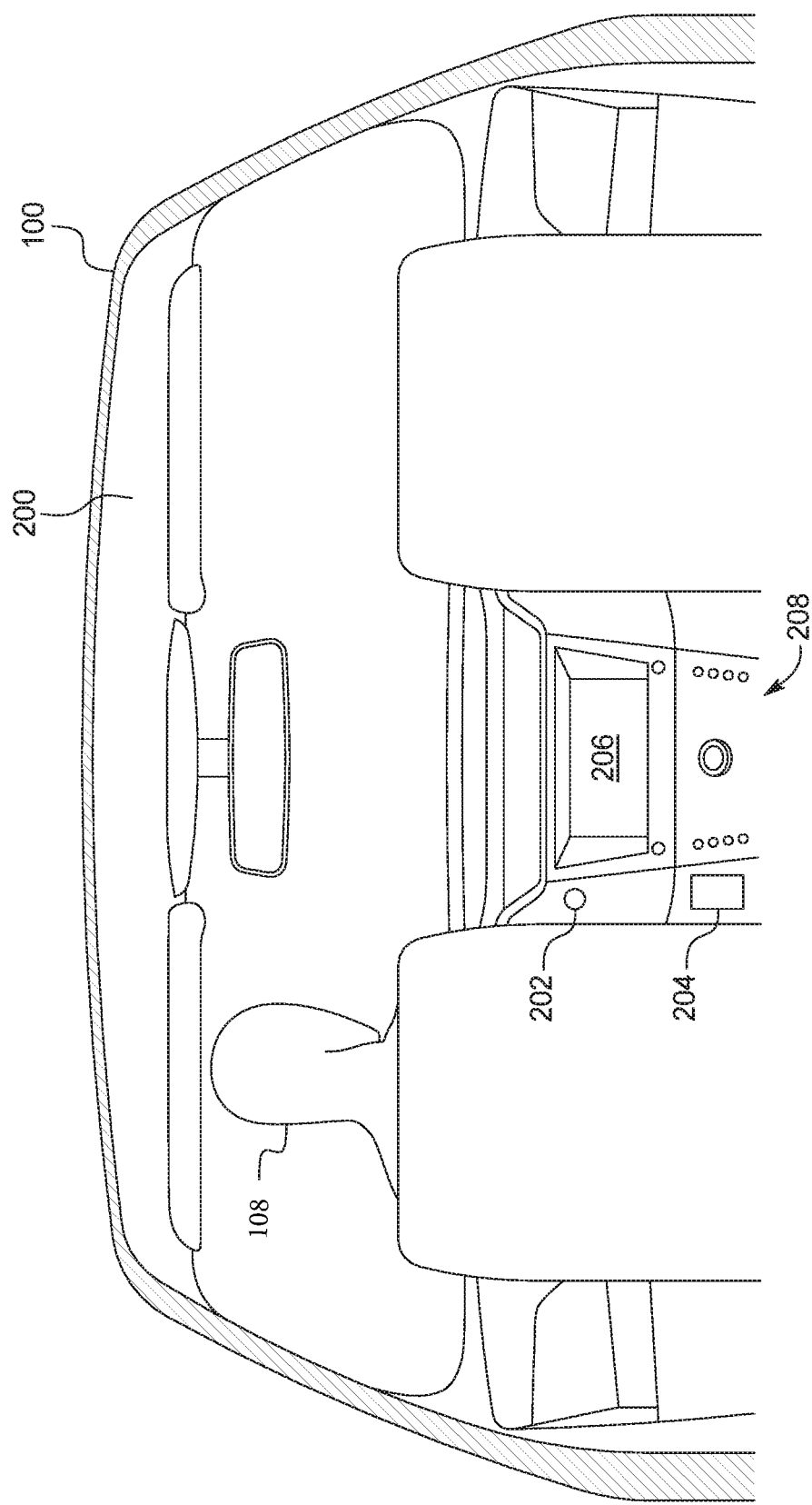
FIG. 2 is a side view of example vehicle in accordance with the teachings herein.

FIG. 2 depicts a cabin 200 of the vehicle 100. In the illustrated example, a start button 202, an NFC reader 204, a touchscreen 206, and console input devices 208 are located within the cabin 200 of the vehicle 100. For example, the start button 202, the NFC reader 204, the touchscreen 206, and/or the console input devices 208 are located on a dashboard, a center console, and/or another console of the vehicle 100 that is adjacent to a driver's seat within the cabin 200 to facilitate a vehicle operator (e.g., the user 108, the valet 114, etc.) in utilizing those vehicle features.

In the illustrated example, the console input devices 208 include input device(s), such as switches, buttons, etc., that enable a vehicle operator and/or passenger to control various features of the vehicle 100. Further, in the illustrated example, the touchscreen 206 includes a center console display, such as a liquid crystal display (LCD), an organic light emitting diode (OLED) display, a flat panel display, a solid state display, etc. Additionally or alternatively, the touchscreen 206 includes a heads-up display that is configured to project an image onto a windshield of the vehicle 100. In some examples, the touchscreen 206 is configured to present an infotainment system (such as SYNC® and MyFord Touch® by Ford®) to the vehicle operator and/or passenger(s) within the cabin 200 of the vehicle 100. For example, the user 108 selects to enter the valet mode via the infotainment system operating on the touchscreen 206.

The start button 202 (e.g., an ignition switch) of the illustrated example is configured to start the engine 101 of the vehicle 100. For example, the start button 202 is utilized in a passive start system to start the engine 101. In some examples, the valet controller 118 is configured to prime the engine 101 for passive starting in response to detecting that the key fob 110, the mobile device 112, and/or the NFC device 116 is located within the cabin 200 of the vehicle 100. For example, the valet controller 118 detects when the key fob 110 and/or the mobile device 112 is located in the cabin 200 based on wireless communication with the distance-determination communication modules 102, the vehicle-function communication module 104 and/or the antenna modules 106. Additionally or alternatively, the valet controller 118 detects when the key fob 110, the mobile device 112, and/or the NFC device 116 is located in the cabin 200 based on wireless communication with the NFC reader 204. When the engine 101 is primed, the valet controller 118 starts the engine 101 of the vehicle 100 in response to the user 108, the valet 114, and/or another operator pressing the start button 202. That is, the valet controller 118 activates the engine 101 in response to detecting that (1) a designated remote device (e.g., the key fob 110, the mobile device 112, the NFC device 116) is located in the cabin 200 of the vehicle 100 and (2) the start button 202 subsequently being actuated or engaged.

The NFC reader 204 (also referred to as an interior NFC reader or a cabin NFC reader) is an NFC device that is configured to wirelessly communicate with a remote NFC device (e.g., the key fob 110, the mobile device 112, the NFC device 116) when the remote NFC device is aligned with and within a predetermined distance of the NFC reader 204. In some examples, the NFC reader 204 includes a shelf and/or holster to enable the remote NFC device to rest in a position that enables communication with the NFC reader 204. The NFC reader 204 of the illustrated example is configured to enable the valet controller 118 to activate the valet mode of the vehicle 100 and/or to authenticate a remote NFC device for the valet mode.

In operation, the valet controller 118 monitors for the user 108 selecting to enter the valet mode of the vehicle 100 when the engine 101 of the vehicle 100 is active. For example, the valet controller 118 detects that the user 108 has selected to enter the valet mode in response to the touchscreen 206 receiving a selection to enter the valet mode. In some examples, the touchscreen 206 is configured to receive a selection to authenticate the NFC device 116 for the valet mode. Additionally or alternatively, the valet controller 118 detects that the user 108 has selected to enter the valet mode in response to NFC reader 204 communicating with the NFC device 116 and/or another designated for the valet mode of the vehicle 100. Upon entering the valet mode, the valet controller 118 limits one or more vehicle functions of the vehicle 100.

Further, the valet controller 118 authenticates the NFC device 116 for the valet mode. For example, the valet controller 118 is configured to authenticate the NFC device 116 when the NFC device 116 is positioned adjacent to and in wireless communication with the NFC reader 204. For example, the NFC reader 204 sends the NFC device 116 device a message with an authentication token (e.g., an encrypted identifier, an encrypted counter, etc.) that enables the NFC device 116 to temporarily operate a predefined set of vehicle functions while the vehicle 100 remains in the valet mode. That is, the valet controller 118 is configured to enter the valet mode and authenticate the NFC device 116 for the valet mode when the engine 101 is active and the NFC reader 204 detects the NFC device 116. In some examples, the touchscreen 206 and/or the mobile device 112 of the user 108 is configured to present a confirmation screen upon the NFC reader 204 detecting the NFC device 116. In such examples, the valet controller 118 enters the valet mode in response to the user 108 providing a confirmation and does not enter the valet mode in response to the user 108 providing a cancellation.

When the vehicle 100 is in the valet mode, the valet 114 is enabled to start the vehicle 100 utilizing the NFC device 116. For example, the valet starts the engine 101 of the vehicle 100 by (1) placing the NFC device 116 next to the NFC reader 204 inside the cabin 200 such that the NFC reader 204 is in communication with the NFC device 116 and (2) subsequently pressing the start button 202.

Figure 3:
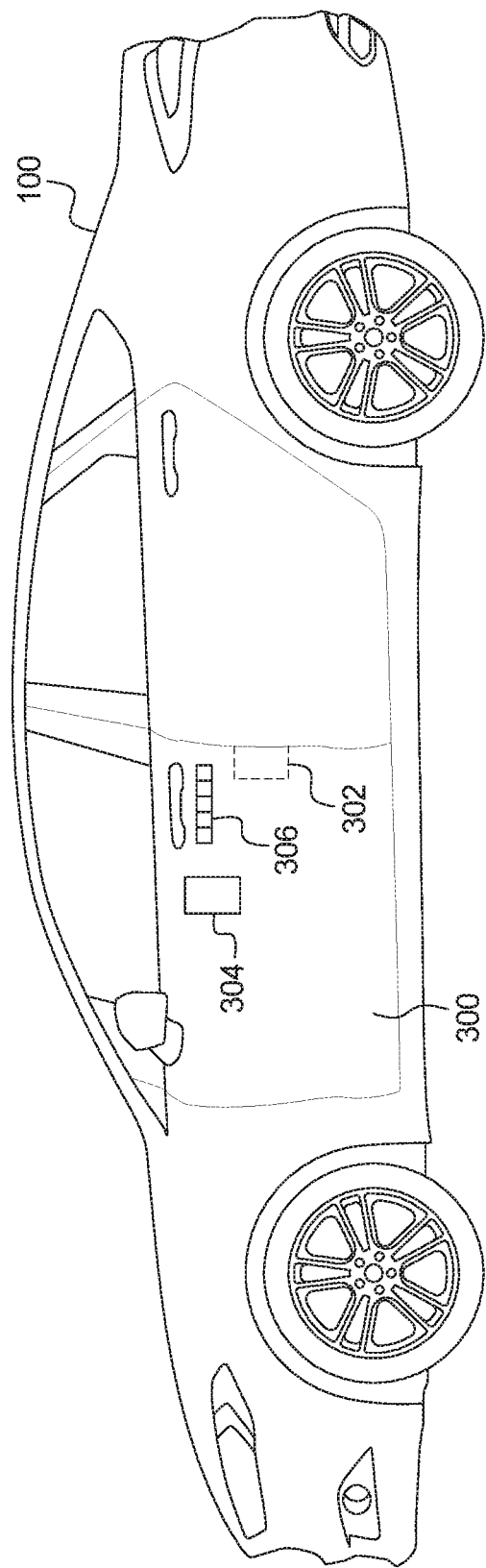
FIG. 3 illustrates a cabin of the vehicle of FIG. 2.

FIG. 3 illustrates a side view of an exterior surface of the vehicle 100. For example, the vehicle 100 includes a door 300. In the illustrated example, a door lock 302, an NFC reader 304, and a keypad 306 are positioned on the door 300. In other examples, the door lock 302, the NFC reader 304, and/or the keypad 306 are located at other positions along the exterior surface of the vehicle 100.

Further, in some examples, the vehicle 100 includes an electronic latch (also referred to as an e-latch). The e-latch is an electromechanical device that actuates the door lock 302 to lock and/or unlock the door 300 to prevent and/or provide access to the cabin 200, respectively. In some examples, the e-latch and the door lock 302 are utilized for a passive entry system of the vehicle 100. For example, the valet controller 118 primes the e-latch for unlocking the door 300 in response to detecting that a designated remote device (e.g., the key fob 110, the mobile device 112, the NFC device 116) is located within a predetermined distance of the door 300. Subsequently, the e-latch actuates the door lock 302 to unlock the door 300 in response to detecting that a door handle of the door 300 is being grasped. That is, the valet controller 118 unlocks the door 300 via the door lock 302 for the passive entry system in response to detecting that (1) a designated remote device is within a predetermined distance of the door 300 and (2) a door handle of the door 300 is being grasped.

The NFC reader 304 (also referred to as an exterior NFC reader) is an NFC device that is configured to wirelessly communicate with a remote NFC device (e.g., the key fob 110, the mobile device 112, the NFC device 116) when the remote NFC device is aligned with and within a predetermined distance of the NFC reader 304. In some examples, the NFC reader 304 includes a shelf and/or holster to enable the remote NFC device to rest in a position that enables communication with the NFC reader 304. The NFC reader 304 of the illustrated example is configured to enable passive entry of the vehicle 100. For example, the valet controller 118 causes the door lock 302 to unlock the door 300 in response to the NFC reader 304 establishing communication with the key fob 110 and/or the mobile device 112 of the user 108. That is, the valet controller 118 unlocks the door 300 when the key fob 110 and/or the mobile device 112 is held in front of the NFC reader 304. Additionally or alternatively, when the vehicle 100 is in the valet mode, the valet controller 118 causes the door lock 302 to unlock the door 300 in response to the NFC reader 304 establishing communication with the NFC device 116 when the NFC device 116 is authenticated for use in the valet mode. That is, the valet controller 118 unlocks the door 300 when the NFC device 116 is held in front of the NFC reader 304 when the vehicle 100 is in the valet mode.

The keypad 306 of the illustrated example is configured to receive a code from the user 108 (e.g., to unlock the door 300, to start the engine 101, etc.). The keypad 306 includes buttons that are labeled with characters (e.g., numeric characters, alphabetic characters, alphanumeric characters) to enable the user 108 to identify the buttons. For example, to enable the user 108 to enter a numeric code, one button may be labeled "1-2," another button may be labeled "3-4," another button may be labeled "5-6," another button may be labeled "7-8," and another button may be labeled "9-0." In other examples, the keypad 306 is located on any other portion of the exterior surface of the vehicle 100. In other examples, the keypad 306 is a virtual keypad that is projected onto a surface (e.g., a window) of the vehicle 100. Further, in some examples, the vehicle 100 includes a plurality of keypads that are located at and/or projected onto different positions on the exterior surface of the vehicle 100.

In the illustrated example, the NFC reader 304 and/or the keypad 306 are configured to enable the user 108 to set the vehicle 100 in the valet mode and/or authenticate the NFC device 116 for the valet mode. For example, the valet controller 118 is configured to enter the valet mode and/or authenticate the NFC device 116 for the valet mode in response to detecting that (1) the NFC device 116 is behind held in front of and/or is otherwise positioned to communicate with the NFC reader 304 and (2) the keypad 306 has received a predefined code for entering the valet mode. In some examples, the NFC reader 304 and/or the keypad 306 are configured for entering the valet mode and/or authenticating the NFC device 116 when the engine 101 of the vehicle 100 is active. For example, the valet controller 118 enters the valet mode and/or authenticates the NFC device 116 in response to detecting that (1) the NFC device 116 is in communication with the NFC reader 304, (2) the keypad 306 has received a predefined code for entering the valet mode, and (3) the engine 101 is active.

Further, the NFC reader 304 and/or the keypad 306 are configured to enable the user 108 to exit the valet mode and/or de-authenticate the NFC device 116 for the valet mode. For example, the valet controller 118 is configured to exit the valet mode and/or de-authenticate the NFC device 116 for the valet mode in response to the NFC reader 304 communicating with the key fob 110, the mobile device 112 and/or another NFC device of the user 108 that is not limited to use in the valet mode. Additionally or alternatively, the valet controller 118 is configured to exit the valet mode and/or de-authenticate the NFC device 116 for the valet mode in response to the keypad 306 receiving a predefined code for exiting the valet mode.

Additionally or alternatively, the valet controller 118 is configured to enter the valet mode and/or authenticate the NFC device 116 for the valet mode based on communication between the mobile device 112 and the distance-determination communication modules 102, the vehicle-function communication module 104, and/or the antenna modules 106. For example, the mobile device 112 may include hardware and software for communicating via near-field communication. In other examples, hardware for near-field communication (e.g., an NFC antenna) is coupled to the mobile device 112. In turn, the mobile device 112 is configured to communicate with the NFC device 116 when the NFC device 116 is aligned with and within a predetermined distance of the NFC antenna of the mobile device 112. The valet controller 118 is configured to enter the valet mode and/or authenticate the NFC device 116 for the valet mode when the mobile device 112 is within a communication range of the distance-determination communication modules 102, the vehicle-function communication module 104, and/or the antenna modules 106 of the vehicle 100. For example, the valet controller 118 is configured to enter the valet mode and/or authenticate the NFC device 116 for the valet mode in response to receiving an instruction signal (e.g., via the distance-determination communication modules 102, the vehicle-function communication module 104, and/or the antenna modules 106) that the mobile device 112 transmits when an NFC reader of the mobile device 112 is in communication with the NFC device 116. In some examples, the valet controller 118 is configured to enter the valet mode and/or authenticate the NFC device 116 based on communication with the mobile device 112 when the engine 101 of the vehicle 100 is inactive. For example, the valet controller 118 enters the valet mode and/or authenticates the NFC device 116 in response to detecting that (1) the instruction signal has been received from the mobile device 112 and (2) the engine 101 is inactive.

Figure 4:
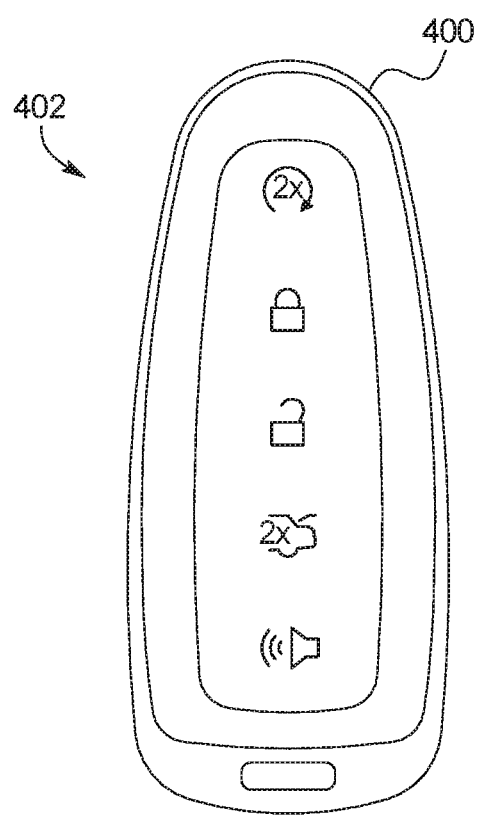
FIG. 4 illustrates an example remote NFC device in accordance with the teachings herein.

FIG. 4 illustrates an example NFC device 400 in accordance with the teachings herein. That is, the NFC device 400 is an example of the NFC device 116 of FIG. 1. In the illustrated example, the NFC device 400 is in the form of a key fob. For example, the NFC device 400 includes buttons 402 that are configured to initiate remote entry, remote start, remote park-assist, and/or other vehicle functions remotely. Additionally, the NFC device 400 includes hardware and software for wireless communication with the vehicle. For example, the NFC device 400 includes an LF antenna, a UHF antenna, and/or other type of antenna to communicate with the distance-determination communication modules 102 of the vehicle 100. Additionally or alternatively, the NFC device 400 includes a BLE antenna and/or another type of antenna to communicate with the vehicle-function communication module 104 and/or the antenna modules 106 of the vehicle 100. Further, the NFC device 400 of the illustrated example includes an NFC antenna for communication with the NFC reader 204 of the vehicle 100, the NFC reader 304 of the vehicle 100, and/or an NFC reader of the mobile device 112.

In some examples, the valet controller 118 is configured to enter the valet mode and/or authenticate the NFC device 400 for the valet mode based on a pressing of one or more of the buttons 402. For example, when the engine 101 of the vehicle 100 is active, the valet controller 118 is configured to enter the valet mode and/or authenticate the NFC device 400 for the valet mode in response to a predefined code being received by the buttons 402 of the NFC device 400 while the NFC device 400 is in communication with the NFC reader 204. That is, to enter the valet mode and/or authenticate the NFC device 400 for the valet mode, the user 108 is to press a predefined sequence and/or combination of the buttons 402 of the NFC device 400.

Additionally or alternatively, when the engine 101 of the vehicle 100 is inactive, the valet controller 118 is configured to enter the valet mode and/or authenticate the NFC device 400 for the valet mode in response to a predefined code being received by the buttons 402 of the NFC device 400 while the mobile device 112 is in communication with one or more communication modules of the vehicle 100. That is, to enter the valet mode and/or authenticate the NFC device 400 for the valet mode, the user 108 is to press a predefined sequence and/or combination of the buttons 402 of the NFC device 400. For example, the valet controller 118 is configured to enter the valet mode and/or authenticate the NFC device 400 for the valet mode in response to receiving an instruction signal (e.g., via the distance-determination communication modules 102, the vehicle-function communication module 104, and/or the antenna modules 106) that the mobile device 112 transmits when a predefined code is received via the buttons 402 of the NFC device 400.

In some examples, the user 108 is to press a predefined sequence and/or combination of the buttons 402 while holding and/or otherwise placing the NFC device 400 in front of the NFC reader 204 to enable the NFC device 400 to communicate the corresponding signal via NFC. In other examples, the NFC device 400 is configured to communicate the corresponding signal via other communication protocols, such as BLE communication, when the NFC device 400 is located away from the NFC reader 204.

Figure 5:
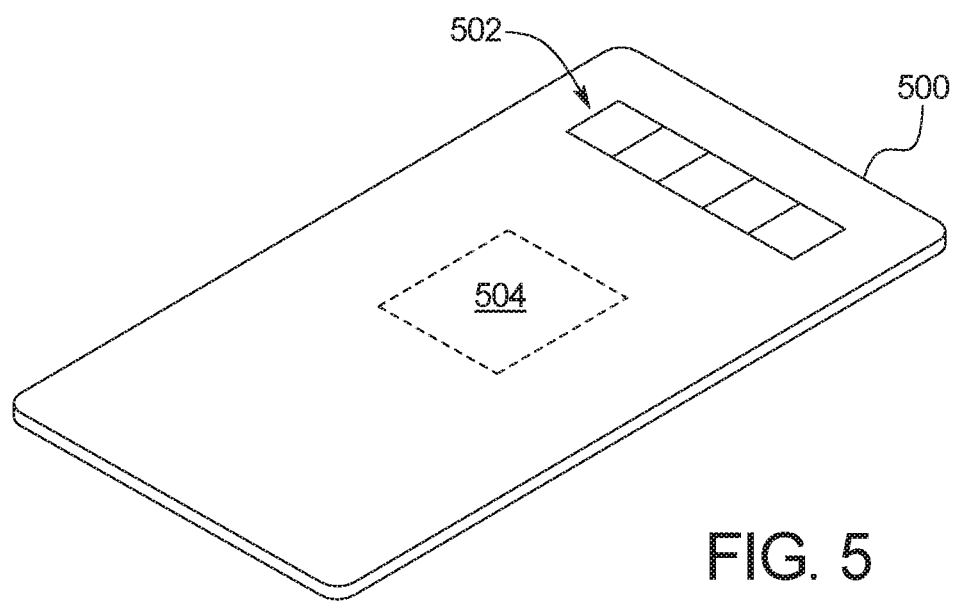
FIG. 5 illustrates another example remote NFC device in accordance with the teachings herein.

FIG. 5 illustrates another example NFC device 500 in accordance with the teachings herein. That is, the NFC device 500 is an example of the NFC device 116 of FIG. 1. In the illustrated example, the NFC device 500 is a battery-less device that has a form factor of a credit card. For example, the NFC device 500 includes buttons 502 that are configured to remotely initiate vehicle functions (e.g., remote entry, remote start, remote park-assist, entry into the valet mode, authentication of the NFC device 500 for the valet mode, etc.). Additionally, the NFC device 500 includes hardware and software for wireless communication with the vehicle. For example, the NFC device 500 includes an NFC antenna 504 for communication with the NFC reader 204 of the vehicle 100, the NFC reader 304 of the vehicle 100, and/or an NFC reader of the mobile device 112. Further, in some examples, the NFC device 500 includes an LF antenna, a UHF antenna, and/or other type of antenna to communicate with the distance-determination communication modules 102 of the vehicle 100. Additionally or alternatively, the NFC device 500 includes a BLE antenna and/or another type of antenna to communicate with the vehicle-function communication module 104 and/or the antenna modules 106 of the vehicle 100.

In some examples, the valet controller 118 is configured to enter the valet mode and/or authenticate the NFC device 500 for the valet mode based on a pressing of one or more of the buttons 502. For example, when the engine 101 of the vehicle 100 is active, the valet controller 118 is configured to enter the valet mode and/or authenticate the NFC device 500 for the valet mode in response to a predefined code being received by the buttons 502 of the NFC device 500. That is, to enter the valet mode and/or authenticate the NFC device 500 for the valet mode, the user 108 is to press a predefined sequence and/or combination of the buttons 502 of the NFC device 500.

Additionally or alternatively, when the engine 101 of the vehicle 100 is inactive, the valet controller 118 is configured to enter the valet mode and/or authenticate the NFC device 500 for the valet mode in response to a predefined code being received by the buttons 502 of the NFC device 500 while the mobile device 112 is in communication with one or more communication modules of the vehicle 100. That is, to enter the valet mode and/or authenticate the NFC device 500 for the valet mode, the user 108 is to press a predefined sequence and/or combination of the buttons 502 of the NFC device 500. For example, the valet controller 118 is configured to enter the valet mode and/or authenticate the NFC device 500 for the valet mode in response to receiving an instruction signal (e.g., via the distance-determination communication modules 102, the vehicle-function communication module 104, and/or the antenna modules 106) that the mobile device 112 transmits when a predefined code is received via the buttons 502 of the NFC device 500.

In some examples, the user 108 is to press a predefined sequence and/or combination of the buttons 502 while holding and/or otherwise placing the NFC device 500 in front of the NFC reader 204 to enable the NFC device 400 to communicate the corresponding signal via NFC. In other examples, the NFC device 500 is configured to communicate the corresponding signal via other communication protocols, such as BLE communication, when the NFC device 500 is located away from the NFC reader 204.

Figure 6:
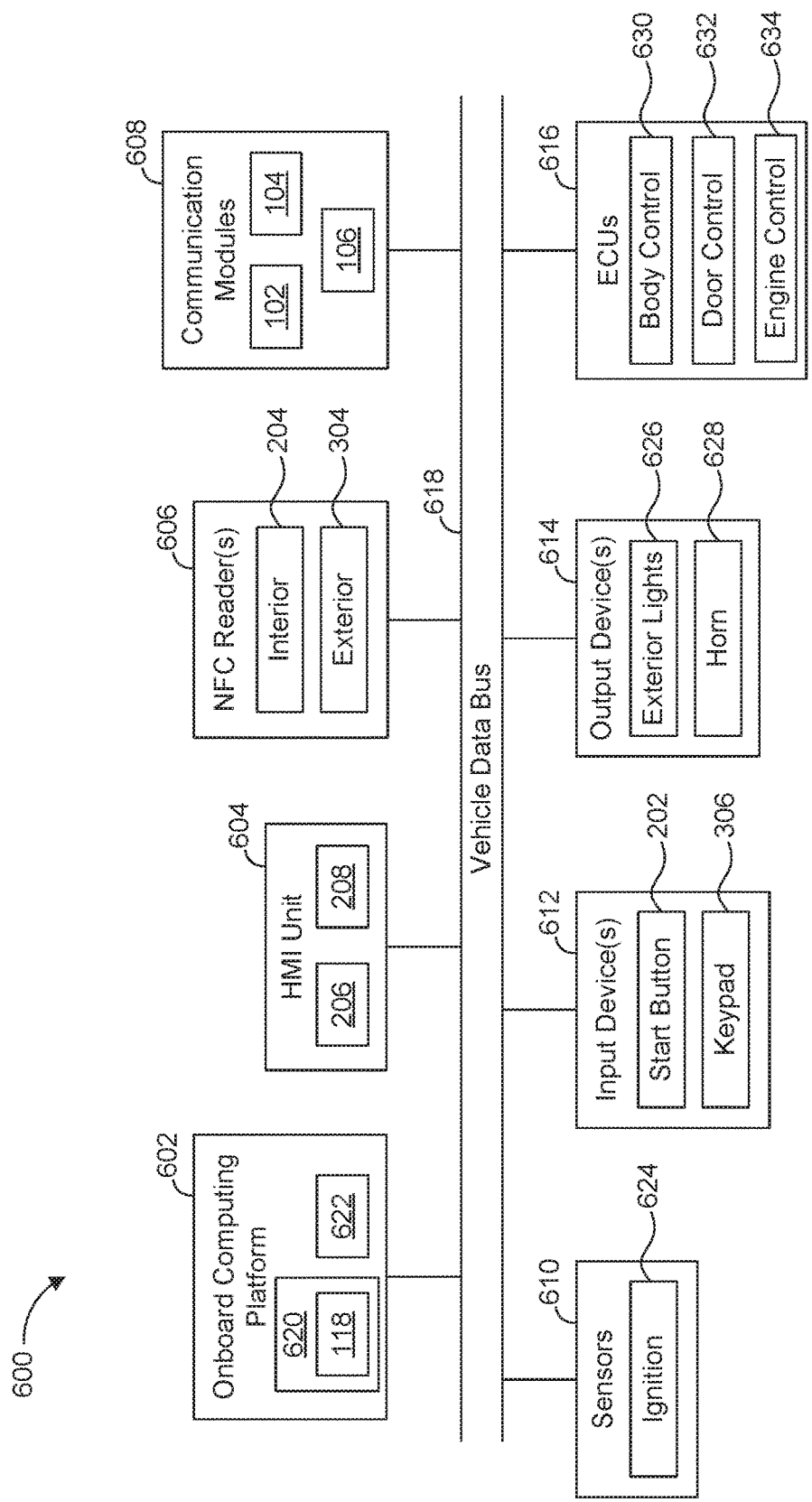
FIG. 6 is a block diagram of electronic components of the vehicle of FIG. 2.

FIG. 6 is a block diagram of electronic components 600 of the vehicle 100. In the illustrated example, the electronic components 600 include an onboard computing platform 602, a human-machine interface (HMI) unit 604, NFC readers 606, communication modules 608, sensors 610, input devices 612, output devices 614, electronic control units (ECUs) 616, and a vehicle data bus 618.

The onboard computing platform 602 includes a processor 620 (also referred to as a microcontroller unit and a controller) and memory 622. In the illustrated example, the processor 620 of the onboard computing platform 602 is structured to include the valet controller 118. In other examples, the valet controller 118 is incorporated into another ECU with its own processor and memory. The processor 620 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 622 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 622 includes multiple kinds of memory, particularly volatile memory and non-volatile memory.

The memory 622 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 622, the computer readable medium, and/or within the processor 620 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The HMI unit 604 provides an interface between the vehicle 100 and a user. The HMI unit 604 includes digital and/or analog interfaces (e.g., input devices and output devices) to receive input from and display information for the user(s). For example, the input devices include the touchscreen 206, the console input devices 208 and other devices, such as a control knob(s), instrument panel(s), digital camera(s) for image capture and/or visual command recognition, touchscreen(s), audio input device(s) (e.g., cabin microphone), button(s), touchpad(s), etc. The output devices include the touchscreen 206. Additionally or alternatively, the output devices may include instrument cluster outputs (e.g., dials, lighting devices), actuators, speakers, etc.

In the illustrated example, the NFC readers 606 include the NFC reader 204 and the NFC reader 304. Further, the communication modules 608 include the distance-determination communication modules 102, the vehicle-function communication module 104, and the antenna modules 106.

The sensors 610 are arranged in and/or around the vehicle 100 to monitor properties of the vehicle 100 and/or an environment in which the vehicle 100 is located. One or more of the sensors 610 may be mounted to measure properties around an exterior of the vehicle 100. Additionally or alternatively, one or more of the sensors 610 may be mounted inside a cabin of the vehicle 100 or in a body of the vehicle 100 (e.g., an engine compartment, wheel wells, etc.) to measure properties in an interior of the vehicle 100. For example, the sensors 610 include accelerometers, odometers, tachometers, pitch and yaw sensors, wheel speed sensors, microphones, tire pressure sensors, biometric sensors and/or sensors of any other suitable type. In the illustrated example, the sensors 610 include an ignition switch sensor 624 that is configured to detect a state of an engine and/or a motor of the vehicle 100. For example, ignition switch sensor 624 detects whether the engine and/or the motor is active and/or inactive.

The input devices 612 provide an interface between the vehicle 100 and an operator (e.g., the user 108, the valet 114) to receive input information from the operator. The input devices 612 may include digital interface(s) and/or analog interface(s). In some examples, the input devices 612 include a control knob, an instrument panel, a digital camera, a cabin microphone, a button, a touchpad, the touchscreen 206, the console input devices 208, etc. Further, in the illustrated example, the input devices 612 include the start button 202 for the engine and the keypad 306 for receiving code(s) from an operator.

The output devices 614 provide an interface for the vehicle 100 to present information to the operator and/or others nearby. The output devices 614 may include digital interface(s) and/or analog interface(s). In some examples, the output devices 614 include instrument cluster output(s) and/or the touchscreen 206. Further, in the illustrated example, the output devices 614 include exterior lamps 626 and a horn 628. For example, in response to entering valet mode, the valet controller 118 emits a visual alert via the exterior lamps 626 and/or an audio alert via the horn 628 to notify the user 108 that the vehicle 100 has entered the valet mode.

The ECUs 616 monitor and control the subsystems of the vehicle 100. For example, the ECUs 616 are discrete sets of electronics that include their own circuit(s) (e.g., integrated circuits, microprocessors, memory, storage, etc.) and firmware, sensors, actuators, and/or mounting hardware. The ECUs 616 communicate and exchange information via a vehicle data bus (e.g., the vehicle data bus 618). Additionally, the ECUs 616 may communicate properties (e.g., status of the ECUs 616, sensor readings, control state, error and diagnostic codes, etc.) to and/or receive requests from each other. For example, the vehicle 100 may have dozens of the ECUs 616 that are positioned in various locations around the vehicle 100 and are communicatively coupled by the vehicle data bus 618.

In the illustrated example, the ECUs 616 include a body control module 630, a door control unit 632, and an engine control unit 634. The body control module 630 controls one or more subsystems throughout the vehicle 100, such as an immobilizer system, etc. For example, the body control module 630 includes circuits that drive one or more of relays (e.g., to control wiper fluid, etc.), brushed direct current (DC) motors (e.g., to control power seats, wipers, etc.), stepper motors, LEDs, etc. The door control unit 632 controls one or more subsystems located on a door of the vehicle 100. For example, the door control unit 632 includes circuits that drive relay(s), brushed DC motor(s), stepper motor(s), LEDs, etc. for the operation of power windows, power locks, power mirrors, etc. Further, the engine control unit 634 controls operation (e.g., passive starting) of an engine of the vehicle 100.

The vehicle data bus 618 communicatively couples the onboard computing platform 602, the HMI unit 604, the NFC readers 606, the communication modules 608, the sensors 610, the input devices 612, the output devices 614, and the ECUs 616. In some examples, the vehicle data bus 618 includes one or more data buses. The vehicle data bus 618 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
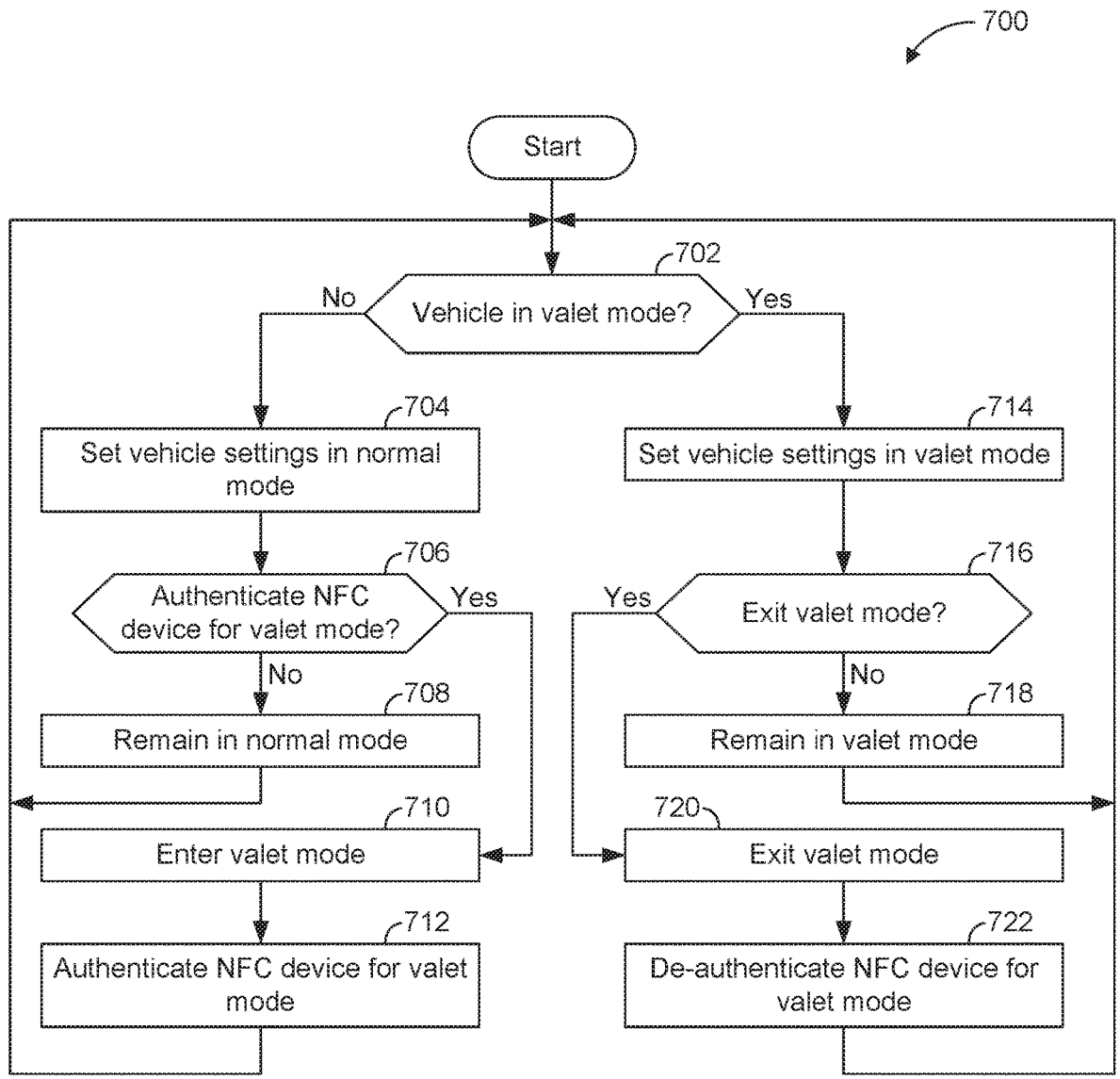
FIG. 7 is a flowchart for activating a valet mode of a vehicle and authenticating a NFC device for the valet mode in accordance with the teachings herein.

FIG. 7 is a flowchart of an example method 700 to activate a valet mode of a vehicle and authenticate an NFC device for the valet mode. The flowchart of FIG. 7 is representative of machine readable instructions that are stored in memory (such as the memory 622 of FIG. 6) and include one or more programs which, when executed by a processor (such as the processor 620 of FIG. 6), cause the vehicle 100 to implement the example valet controller 118 of FIGS. 1 and 6. While the example program is described with reference to the flowchart illustrated in FIG. 7, many other methods of implementing the example valet controller 118 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the valet controller 118 determines whether a valet mode of the vehicle 100 is currently active. In response to the valet controller 118 determining that the vehicle 100 is not in the valet mode, the method 700 proceeds to block 704. Otherwise, in response to the valet controller 118 determining that the vehicle 100 is in the valet mode, the method 700 proceeds to block 714.

At block 704, the valet controller 118 sets vehicle settings of the vehicle 100 in a normal mode. For example, when setting the vehicle settings of the vehicle 100 in the normal mode, the valet controller 118 (1) sets the touchscreen 206 in an unlocked mode, (2) delimits a travelling speed of the vehicle 100, (3) delimits a travelling distance of the vehicle 100, etc.

At block 706, the valet controller 118 determines whether an input sequence has been received to authenticate the NFC device 116 for the valet mode of the vehicle 100. For example, while the engine 101 of the vehicle 100 is active, the valet controller 118 receives an input sequence for authenticating the NFC device 116 for the valet mode in response to (1) the NFC reader 204 communicating with the NFC device 116, (2) the NFC reader 204 receiving a predefined passcode from the NFC device 116, (3) the keypad 306 receiving a predefined passcode and the NFC reader 304 communicating with the NFC device 116, and/or (4) the NFC reader 304 receiving a predefined passcode from the NFC device 116. Additionally or alternatively, while the engine 101 of the vehicle 100 is inactive, the valet controller 118 receives an input sequence for authenticating the NFC device 116 for the valet mode in response to (1) the vehicle-function communication module 104 receiving a signal from the mobile device 112 of the user 108 when the mobile device 112 is within a predefined distance of the vehicle 100, and/or (2) the vehicle-function communication module 104 receiving a predefined passcode entered via the NFC device 116 when the mobile device 112 is within a predefined distance of the vehicle 100.

In response to the valet controller 118 determining that an input sequence has not been received to authenticate the NFC device 116 for the valet mode, the method 700 proceeds to block 708 at which the valet controller 118 causes the vehicle 100 to remain in the normal mode. Otherwise, in response to the valet controller 118 determining that an input sequence has been received to authenticate the NFC device 116 for the valet mode, the method 700 proceeds to block 710 at which the valet controller 118 causes the vehicle 100 to enter the valet mode and block 712 at which the valet controller 118 authenticates the NFC device 116 for the valet mode. For example, the valet controller 118 authenticates the NFC device 116 for the valet mode by communicating with the NFC device 116 via (i) the NFC reader 204, (ii) the NFC reader 304, and/or (iii) the vehicle-function communication module 104, the mobile device 112, and the NFC reader of the mobile device 112.

At block 714, the valet controller 118 sets vehicle settings of the vehicle 100 in a valet mode. For example, when setting the vehicle settings of the vehicle 100 in the valet mode, the valet controller 118 (1) sets the touchscreen 206 in a locked mode, (2) limits a travelling speed of the vehicle 100, (3) limits a travelling distance of the vehicle 100, etc.

At block 716, the valet controller 118 determines whether an input sequence has been received to deactivate the valet mode of the vehicle 100. For example, the valet controller 118 receives an input sequence for deactivating the valet mode in response to (1) the engine 101 of the vehicle being started with a non-valet-mode device (e.g., the key fob 110, the mobile device 112) and/or (2) the keypad 306 receiving a predefined code for exiting the valet mode.

In response to the valet controller 118 determining that an input sequence has not been received to deactivate the valet mode, the method 700 proceeds to block 718 at which the valet controller 118 causes the vehicle 100 to remain in the valet mode. Otherwise, in response to the valet controller 118 determining that an input sequence has been received to deactivate the valet mode, the method 700 proceeds to block 720 at which the valet controller 118 causes the vehicle 100 to exit the valet mode and block 722 at which the valet controller 118 de-authenticates the NFC device 116 for the valet mode.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle system comprising:
   a remote near-field communication (NFC) device; and
   a vehicle including:
   an engine;
   a cabin;
   an interior NFC reader located in the cabin; and
   a controller configured to enter a valet mode and authenticate the remote NFC device for the valet mode when the engine is active and the interior NFC reader communicates with the remote NFC device, wherein, while in the valet mode, the controller is configured for different vehicle settings and information access authorizations and the vehicle is configured for an operating mode with limited vehicle function capabilities,
   and wherein the authentication of the remote NFC device for the valet mode comprises tapping the remote NFC device to a mobile device of a user when the mobile device is proximate to the vehicle and the vehicle is inactive.

2. The vehicle system of claim 1, wherein the controller is configured to remain in the valet mode after the engine is deactivated.

3. The vehicle system of claim 1, wherein, while in the valet mode, the controller is configured to set a center console display in a locked mode, limit a travelling speed, and limit a travelling distance.

4. The vehicle system of claim 1, wherein the vehicle further includes a touchscreen that is configured to present a confirmation screen upon the interior NFC reader communicating with the remote NFC device and prior to the controller entering the valet mode, and wherein an owner of the vehicle provides confirmation on the confirmation screen prior to the controller entering the valet mode.

5. The vehicle system of claim 1, wherein the remote NFC device is a key fob.

6. The vehicle system of claim 1, wherein the remote NFC device is a battery-less device.

7. The vehicle system of claim 6, wherein the remote NFC device has a form factor of a credit card.

8. The vehicle system of claim 1, wherein the remote NFC device includes one or more buttons, and wherein the controller is configured to enter the valet mode and authenticate the remote NFC device for the valet mode when the engine is active, and a predefined code is received via the one or more buttons.

9. The vehicle system of claim 1, wherein the vehicle further includes a start button, and wherein the controller is configured to start the engine in the valet mode in response to the interior NFC reader communicating with the remote NFC device and the start button subsequently being actuated to a start position.

10. The vehicle system of claim 1, wherein the vehicle further includes an exterior NFC reader, a door, and a door lock.

11. The vehicle system of claim 10, wherein the controller is configured to unlock the door lock in the valet mode in response to the exterior NFC reader communicating with the remote NFC device.

12. The vehicle system of claim 10, wherein the controller is configured to exit the valet mode in response to the exterior NFC reader communicating with the mobile device or a key fob of the owner of the vehicle.

13. The vehicle system of claim 10, wherein the vehicle further includes a keypad, and wherein the controller is configured to exit the valet mode in response to the keypad receiving a predefined code.

14. A vehicle comprising:
    a keypad;
    a near-field communication (NFC) reader; and
    a controller configured to enter a valet mode and authenticate a remote NFC device for the valet mode in response to detecting that the remote NFC device is held in front of the NFC reader and the keypad has received a predefined code, wherein, while in the valet mode, the controller is configured for different vehicle settings and information access authorizations and the vehicle is configured for an operating mode with limited vehicle function capabilities,
    and wherein the authentication of the remote NFC device for the valet mode comprises tapping the remote NFC device to a mobile device of a user when the mobile device is proximate to the vehicle and the vehicle is inactive.

15. The vehicle of claim 14, further including an exterior surface along which the keypad and the NFC reader are located.

16. The vehicle of claim 14, further including an engine, wherein the controller is configured to enter the valet mode and authenticate the remote NFC device for the valet mode responsive to detecting that the remote NFC device is held in front of the NFC reader, the keypad has received the predefined code, and the engine is active.

17. The vehicle of claim 14, further including a horn and exterior lamps, wherein the controller is configured to emit an alert via at least one of the horn and the exterior lamps upon entering the valet mode.

18. A vehicle system comprising:
    a remote near-field communication (NFC) device; and
    a vehicle including:
    a communication module for communication with a mobile device; and
    a controller configured to enter a valet mode and authenticate the remote NFC device for the valet mode in response to receiving an instruction signal, via the communication module, that the mobile device transmits, wherein, while in the valet mode, the controller is configured for different vehicle settings and information access authorizations and the vehicle is configured for an operating mode with limited vehicle function capabilities, and wherein the authentication of the remote NFC device for the valet mode comprises tapping the remote NFC device to the mobile device when the mobile device is proximate to the vehicle and the vehicle is inactive.

19. The vehicle system of claim 18, wherein the vehicle further includes an engine, and wherein the controller is configured to enter the valet mode and authenticate the remote NFC device for the valet mode in response to detecting that the engine is active and receiving the instruction signal from the mobile device.

20. The vehicle system of claim 18, wherein the remote NFC device includes one or more buttons, and wherein the controller is configured to enter the valet mode and authenticate the remote NFC device for the valet mode in response to receiving the instruction signal that the mobile device transmits when a predefined code is received via the one or more buttons.

* * * * *